(12) United States Patent
Chen (10) Patent No.: US 10,073,216 B2
(45) Date of Patent: Sep. 11, 2018

(54) LED PANEL LIGHT

(71) Applicant: Jianyue Chen, Taizhou (CN)

(72) Inventor: Jianyue Chen, Taizhou (CN)

(73) Assignee: ZheJiang YongYao Lighting Co., Ltd, Taizhou (CN)

( * ) Notice: Subject to any disclaimer, the term of this patent is extended or adjusted under 35 U.S.C. 154(b) by 411 days.

(21) Appl. No.: 14/919,761

(22) Filed: Oct. 22, 2015

(65) Prior Publication Data
US 2016/0124140 A1    May 5, 2016

(30) Foreign Application Priority Data
Oct. 29, 2014    (CN) .......................... 2014 1 0591379

(51) Int. Cl.
F21V 7/04    (2006.01)
F21V 15/04    (2006.01)
F21V 8/00    (2006.01)

(52) U.S. Cl.
CPC .......... G02B 6/0091 (2013.01); G02B 6/0073 (2013.01); *G02B 6/0051* (2013.01); *G02B 6/0055* (2013.01); *G02B 6/0068* (2013.01); *G02B 6/0085* (2013.01)

(58) Field of Classification Search
CPC .. G02B 6/0091; G02B 6/0073; G02B 6/0085; G02B 6/0055; G02B 6/0068; G02B 6/0051; G02B 6/0093; G02B 6/008; G02B 6/006; F21V 15/04; F21V 19/004; F21V 19/0035; G02F 1/133603; G02F 1/133608; G02F 1/133615; G02F 2001/133322; F21S 4/28

USPC ... 362/390, 97.1, 97.2, 97.3, 97.4, 615, 600, 362/603, 604, 605, 612, 613
See application file for complete search history.

(56) References Cited

U.S. PATENT DOCUMENTS

| | | | |
|---|---|---|---|
| 9,316,381 B2 * | 4/2016 | Kweon | F21V 19/0025 |
| 9,835,794 B1 * | 12/2017 | Wright | G02B 6/0093 |
| 2011/0103093 A1 * | 5/2011 | Tsai | G02B 6/009 362/612 |
| 2012/0281151 A1 * | 11/2012 | Abe | G02B 6/0091 348/739 |

(Continued)

FOREIGN PATENT DOCUMENTS

| | | |
|---|---|---|
| CN | 200910040478.6 | 11/2009 |
| CN | 201020147732.0 | 11/2010 |

(Continued)

*Primary Examiner* — Erin Kryukova
(74) *Attorney, Agent, or Firm* — Minder Law Group; Willy H. Wong (57) ABSTRACT

An LED panel light comprises a cover, LED light bars, two long and strip-shaped seats which are fixed on the side faces of the cover and are used to fasten the LED light bars, and a light guide plate between the two seats with the LED light beads on the LED light bars toward the light guide plate. On the seat, there is a groove designed in the lengthwise direction. The LED light bars are fixed at the bottom face of the groove. On the lower side face of the groove, there is a flange protruding toward the upper side face. On the upper side face of the groove, there are elastic rubber strips installed in the lengthwise direction. The edges of the light guide plate plunge into the groove and the both side faces of the light guide plate press against the flange and the elastic rubber strips, respectively.

13 Claims, 6 Drawing Sheets

(56) References Cited

U.S. PATENT DOCUMENTS

| | | | | |
|---|---|---|---|---|
| 2013/0010228 A1* | 1/2013 | Hsiao | ............... | G02B 6/0085 |
| | | | | 349/62 |
| 2013/0021790 A1* | 1/2013 | Hsu | ................ | G09F 19/02 |
| | | | | 362/217.1 |
| 2013/0058125 A1* | 3/2013 | Chen | ............... | G02F 1/133615 |
| | | | | 362/602 |
| 2013/0169886 A1* | 7/2013 | Kuromizu | ............ | G02B 6/0088 |
| | | | | 348/739 |
| 2013/0286294 A1* | 10/2013 | Hosoki | ............... | G02B 6/0091 |
| | | | | 348/739 |
| 2014/0085932 A1* | 3/2014 | Jeong | ............... | G02B 6/0091 |
| | | | | 362/613 |
| 2014/0132885 A1* | 5/2014 | Li | ............... | G02B 6/0011 |
| | | | | 349/62 |
| 2014/0184929 A1* | 7/2014 | Nakamura | ........ | G02F 1/133308 |
| | | | | 348/836 |
| 2015/0103558 A1* | 4/2015 | Fobbe | ............... | G02B 6/0081 |
| | | | | 362/612 |

FOREIGN PATENT DOCUMENTS

| CN | 201110145643.1 | 11/2011 |
|---|---|---|
| CN | 202868589 U | 4/2013 |
| CN | 203395664 U | 1/2014 |

\* cited by examiner

LED PANEL LIGHT

RELATED APPLICATIONS

This application claims benefit of Chinese Patent Application No. CN201410591379.8, filed Oct. 29, 2014. The above application is incorporated by reference herein.

BACKGROUND OF THE INVENTION

Field of Invention

The present invention relates to the field of light fixture technology and light structures, and particularly to a type of LED panel light.

Related Art

Along with improvements in the standard of living, the standards for lights have also improved. The function of lights is no longer limited to illumination, but it also plays a role as decoration. The selection of lights considers safety and energy saving, as well as other aspects like material, type, style, and so on. There are a number of different types of lights, including pendant lights, ceiling lights, desk lamps, floor lamps, wall lamps, spotlights, etc. The LED panel light is a new type of light, featuring both illumination and decoration. It has advantages of good energy savings, high luminance, no mercury, no ultraviolet light, no electromagnetic interference (EMI) and radiation, no flickering, light weight, easy installation, etc.

One prior art LED panel light comprises an installation frame, LED light bars, a diffuser plate, a light guide plate, EVA cotton, backing plate, several aluminum battens, electric joints, and an LED driver power supply. LED light bars are installed on the side faces of the installation frame. The diffuser plate, light guide plate, EVA cotton, and backing plate are successively installed on the bottom face of the installation frame. The aluminum battens are firm pressed against the backing plate and fastened to the installation frame. The electric joints and the LED driver power supply are fixed on the backing plate, connected to each other, and the LED driver power supply is connected to the LED light bars.

The LED panel light stated above has an incompact structure. The relative position between the LED light bars and the diffuser plate and the light guide plate is hard to be fixed accurately, and the fastening is not reliable, which easily leads to movements between parts. The incident angle and the distance of the light have a big impact on the beam of light eventually produced from the LED light. Hence, this structure is hard to guarantee the accurate and reliable position between the LED light source and the light guide plate, and then impacts the lighting effect of the whole LED panel light.

SUMMARY OF THE INVENTION

One objective of an embodiment of the invention is to avoid the issues in the prior art stated above, and to provide an LED panel light. The technical issue which the embodiment aims to resolve is to improve the lighting effect.

The above objective can be achieved by an embodiment of the invention:

An LED panel light comprises a cover and LED light bars, two long and strip-shaped seats which are fixed on the side faces of the cover and are used to fasten the LED light bars, and a guide plate between the two seats, with the LED light beads in the LED light bars facing the guide plate. It features that there is a groove configured on the seats in its lengthwise direction. The LED light bars stated above are fixed at the bottom face of the groove. On the lower side face of the groove, there is a flange protruding toward the upper side face; on the upper side face of the groove, there are elastic rubber strips installed in the lengthwise direction. The edges of the light guide plate stated above plunge into the groove and the both side faces of the light guide plate press against the flange and elastic rubber strips herein respectively.

In an embodiment of the LED panel light, the said elastic rubber strips are of a cylinder shape, and there are arc slots designed on the side faces of the groove, into which the elastic rubber strips are embedded. There are arc slots designed on the side faces of the groove, which helps the installation of the cylinder elastic rubber strips. The cylinder elastic rubber strips not only are easy for the installation of the light guide plate, but also quite help impose pressure force on the light guide plate, so as to keep it stable at its position.

In an embodiment of the LED panel light, on the side face opposite to the face where the arc slots are, there are several heat sink strips in the lengthwise direction of the seats. These heat sink strips are parallel to each other and equally spaced. The heat dissipation is very important to LED light fixtures. For light fixtures with the same power factor and LED light beads of the same quality, the LED light fixtures will have a shorter service life if the heat dissipation condition is bad, due to severe light attenuation of the LED light beads working at high temperature. The heat dissipation efficiency will be increased and the light attenuation will be reduced, by using the heat sink strips to enlarge the contact area between the heat and air.

In an embodiment of the LED panel light, on the said heat sink strips, there are screw holes in the lengthwise direction of the seats.

In an embodiment of the LED panel light, the lower side face of the said groove is formed of the first seat sidewall, and the upper side face of the said groove is formed of the second seat sidewall. The said first seat sidewall and the second seat sidewall form a flare.

In an embodiment of the LED panel light, the said flange is located in the edge of the first seat sidewall. The arc slot stated above is located in the edge of the second seat sidewall, and the flange is aligned with the arc slot.

In an embodiment of the LED panel light, there are protrusions designed on the LED light bar. The protrusions are in line with the LED light beads and the height is greater than the height of LED light beads. The outer end of the protrusion leans against the end face of the said light guide plate.

In an embodiment of the LED panel light, there are two protrusions in total and the LED light beads stated above are located between them.

In an embodiment of the LED panel light, there is a recess designed on the end face of the light guide plate, in the lengthwise direction of the seat. The said protrusions are inserted into the recess.

In an embodiment of the LED panel light, the said LED panel light also comprises a frame connecting to the cover. There is a clearance between the frame and the retainer slabs and a driver power converter is installed in the clearance.

In an embodiment of the LED panel light, a reflective film is installed on the top face of the light guide plate, while a diffuser plate is installed on the bottom face.

For one embodiment of the LED panel light in this technical proposal, the connection between the frame and the cover is detachable, so that it is convenient for the assembly, repair, and replacement of the interior parts. The driver power converter is installed in the clearance between the frame and the cover, which can effectively protect the interior parts from being crushed or loosing during the process of transportation and use, so as to reduce the fault rate of the driver power converter and make it more attractive. The service life of the driver power converter typically affects the overall lifespan of the light fixture. The theoretical lifespan of LED light beads on the LED light bar is 0.05 million hours to 0.1 million hours, and the lifespan of the driver power converter is 0.002 million hours to 0.03 million hours, therefore, the overall lifespan of the LED panel light will be increased. A configuration of lateral light source is configured in this LED panel light, where LED light bars are designed in both sides of the light guide plate. The light guide plate scatters the light and turns the light source into a surface light source. Light will be throughout the panel light by multiple scattering with the light guide plate and the inward light will be reflected out by total reflection with the reflective film. The diffuser plate makes the light softer and more uniform. The combination of these factors ensures a high effective light. In this technical proposal, the ends of the light guide plate are inserted into the groove of the seats, so the degree of freedom of the light guide plate in up and down direction is restricted. The LED light bars are fixed on the bottom face of the groove, so that the light beads on the bars are always aligned with the center line of the light guide plate. The light becomes more uniform after being scattered by the light guide plate. The deviation is reduced and the utilization rate is high. On the lower side face of the groove, there is a flange protruding toward the upper side face; on the upper side face of the groove, there are elastic rubber strips installed next to the exterior end, in the lengthwise direction. The elastic rubber strips can mitigate the light leakage from the LED light bars; meanwhile, the side faces of the groove form a clamping arm which holds the light guide plate and keeps a relatively stable position between the light guide plate and the LED light bars. The flange has a smooth arc which plays a guiding role in the assembly. The flange and the elastic rubber strips are easy for the light guide plate to insert in. In addition, the strips are elastic, so the light guide plate is held firmer under the elastic restoring force. This eliminates any clearances between the light guide plate and both side faces of the groove and keeps them fixed, so as to improve the lighting effect and keep it reliable. In this technical proposal, the height of the protrusions is greater than the height of LED light beads. The protrusion leans against the end face of the said light guide plate and limit the position of the light guide plate laterally, so as to ensure a fixed position in the up and down direction and a fixed distance between the light beads on the LED light bar and the light guide plate, and hence, improve the lighting effect.

In an embodiment of the LED panel light, the height of the protrusion is greater than the height of LED light beads by 0.1 mm to 0.5 mm. The luminous range of the light beads on the LED light bar is about 120°. According to the general thickness of the light guide plate and plenty of experiment data, it is concluded that, when the distance between the light beads and the light guide plate is kept 0.1 mm to 0.5 mm, the utilization rate of the light is the highest and the lighting effect is quite better.

In an embodiment of the LED panel light, the LED light bar is bonded to the bottom face of the said groove with thermally conductive adhesive. The thermally conductive adhesive can conduct the heat, increase the heat transfer efficiency when the LED light bar gives out light, reduce light attenuation, improve the lighting effect and extend the service life.

In an embodiment of the LED panel light, on the surface of the light guide plate, there are raised dots or small pits to scatter the light. The raised dots and the small pits are arranged sparsely in both sides and gradually more densely to the middle of the light guide plate. This LED panel light adopts the lateral light source, which allows a thinner LED panel light and a lower volume, compared to that using a straight light source. This requires a spot light source or a line light source to be turned into a surface light source to scatter the light, and the light guide plate is used to achieve this. In this technical proposal, on the surface of the light guide plate, there are raised dots or small pits able to scatter the light. The raised dots and the small pits are arranged sparsely in both sides and gradually more densely to the middle. This design furthest scatters the light from both sides of the light guide plate to form a uniform surface light source, with a high utilization rate and a good lighting effect.

In an embodiment of the LED panel light, the said diffuser plate is made of PMMA, PS, or PC plastic sheets, the said cover is made of iron sheets, and the said frame is made of aluminum alloy. The iron sheets are not expensive and have a high hardness as well, while the aluminum alloy is light and attractive.

In an embodiment of the LED panel light, the cover is rectangular, and there are reinforcing ribs designed in the diagonal direction. The reinforcing ribs are formed by pressing the inner side of the cover outward and enclose a cavity. The reinforcing ribs not only increase the connection strength of the cover, but also, through the provided cavities, allow a more convenient arrangement of the cables of the internal driver power, and reduce the interference and wear of the cables as well.

Compared to the prior art, some embodiments of the LED panel light have the following advantages:
1. The ends of the light guide plate are inserted into the groove of the seats, so the degree of freedom of the light guide plate in up and down direction is restricted. The LED light bars are fixed on the bottom face of the groove, so that the light beads on the bars are always aligned with the center line of the light guide plate. And the light becomes more uniform after being scattered by the light guide plate. The deviation is reduced and the utilization rate is high.
2. In one embodiment, there are protrusions designed on the LED light bar. The height of the protrusions is greater than the height of LED light beads. The protrusion leans against the end face of the said light guide plate and limit the position of the light guide plate laterally, so as to ensure a fixed position in the up and down direction and a fixed distance between the light beads on the LED light bar and the light guide plate, and hence, improve the lighting effect.

DETAILED DESCRIPTION OF THE INVENTION

The embodiments of this invention will be described below and the technical solutions of the invention will be further illustrated in connection with the accompanying figures. However, the invention shall not be limited to these embodiments.

Figure 1:
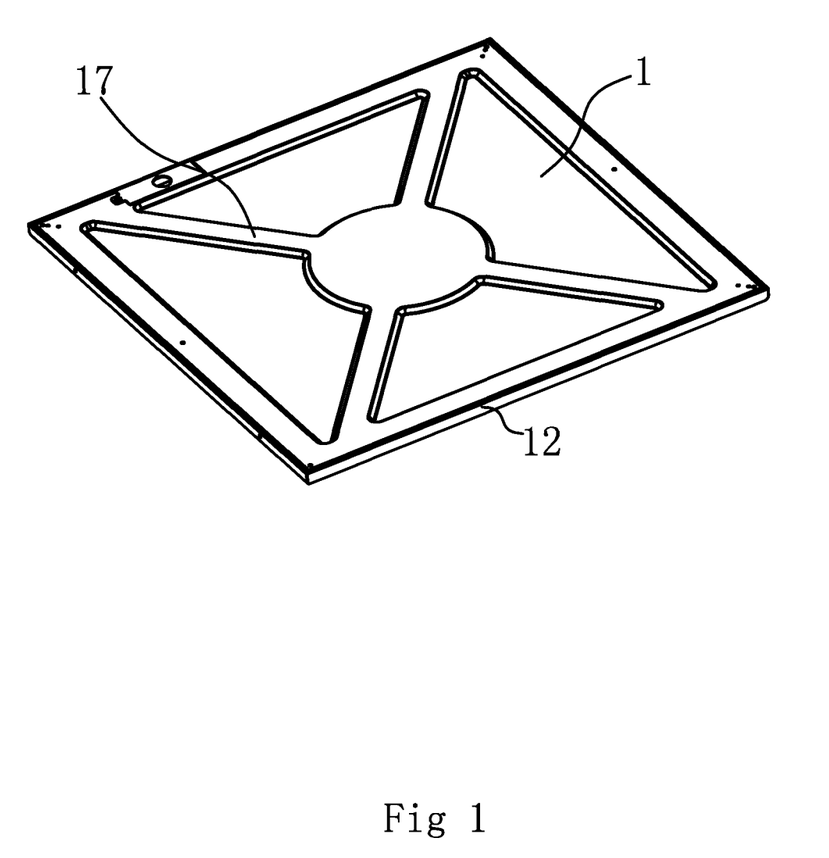
FIG. 1 is a perspective schematic back view of an embodiment of the LED panel light.
Figure 5:
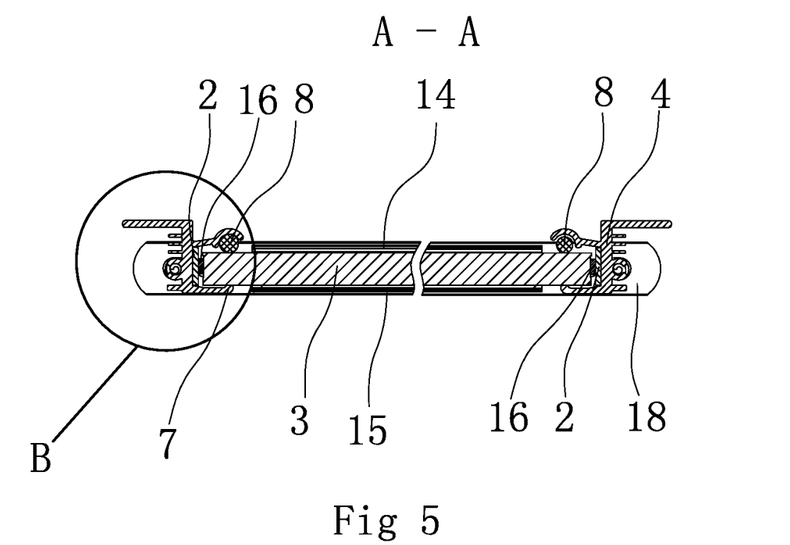
FIG. 5 is a cutaway view of section A-A of FIG. 4.
Figure 6:
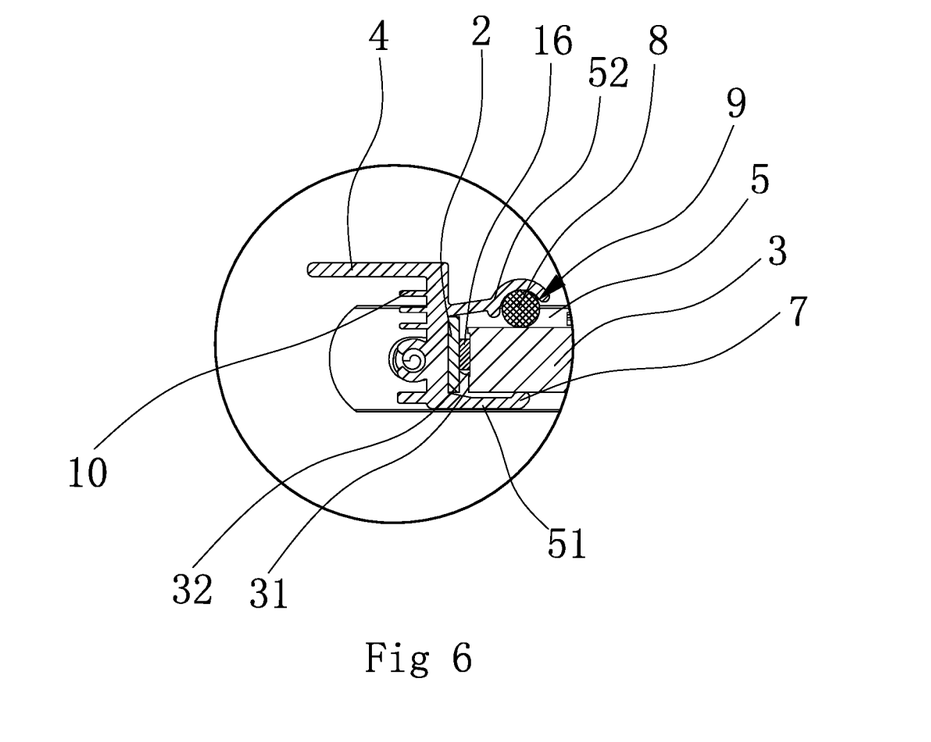
FIG. 6 is a detail view of section B of FIG. 5.
Figure 7:
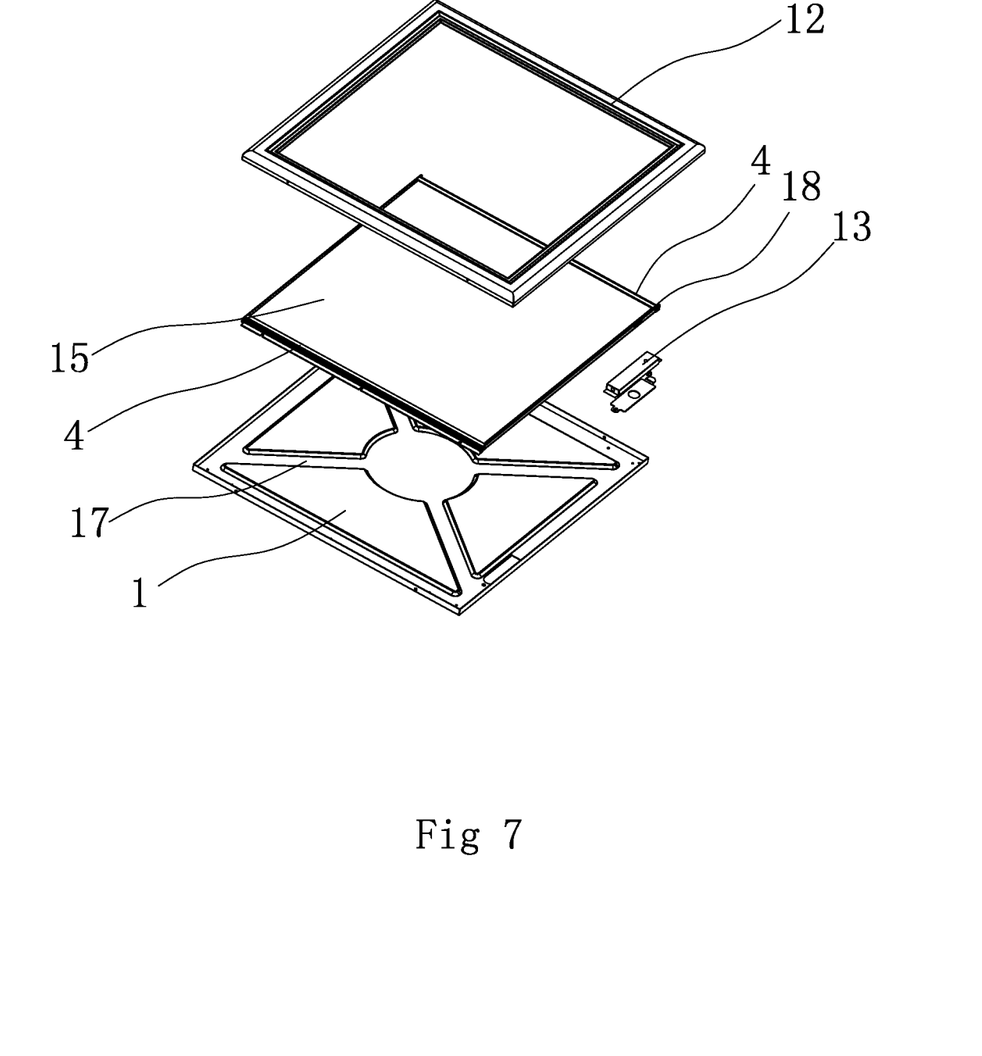
FIG. 7 is an exploded view of an embodiment of the LED panel light.

As shown in FIG. 1 and FIG. 7, an embodiment of the LED panel light comprises a rectangular cover 1. There are reinforcing ribs 17 along the diagonal of the cover 1. The reinforcing ribs 17 are formed by pressing the inner side of the cover 1 outward and enclose a cavity to place the cables. As shown in FIG. 5 and FIG. 6, the LED panel light also comprises LED light bars 2 and the light guide plate 3. On the side faces of the cover 1, there are two seats 4 of long strip shape to fix the LED light bar 2. Seats 4 are fastened to the cover 1. The light guide plate 3 is located between the two seats 4 and the light beads 21 on the LED light bar 2 are toward the light guide plate 3. On the seat 4, there is a groove 5 designed in the lengthwise direction in which the end of the light guide plate 3 can be embedded. The LED light bars 2 are fixed at the bottom face of the groove 5. On the lower side face of the groove 5, there is a flange 7 protruding toward the upper side face. On the upper side face of the groove 5, there are elastic rubber strips 8 installed in the lengthwise direction. The edges of the light guide plate 3 plunge into the groove 5 and the both side faces of the light guide plate 3 press against the flange 7 and the elastic rubber strips 8 respectively. A reflective film 14 is installed on the top face of the light guide plate 3, while a diffuser plate 15 is installed on the bottom face. Since the LED light bars 2 are light and they have a big contact area to connect to the seats 4, the LED light bars 2 and the seats 4 are relatively static and not inclined to loosen. During the assembly and usage, in order to maintain an appropriate lighting angle and distance of the light beads 21 on the LED light bars 2 in relation to the light guide plate 3, it's necessary to ensure an exact and stable position between the light guide plate 3 and the seats 4. This will improve the lighting effect of this LED panel light. The degree of freedom of the light guide plate 3 in the up and down direction is limited by inserting the end face of the light guide plate 3 into the groove 5. The LED light bars 2 are fixed on the bottom face of the groove 5, so that the light beads on the LED light bars 2 are aligned with the center line of the light guide plate 3. The light becomes more uniform after being scattered by the light guide plate 3 and the utilization rate is high. The elastic rubber strips 8 can mitigate the light leakage from the LED light bars 2; meanwhile, the side faces of the groove 5 form a clamping arm which holds the light guide plate 3 and keeps a relatively stable position between the light guide plate 3 and the LED light bars 2. The flange 7 has a smooth arc which plays a guiding role in the assembly. The flange 7 and the elastic rubber strips 8 are easy for the light guide plate to insert in. In addition, the elastic rubber strips 8 are elastic, so the light guide plate 3 is held firmer under the elastic restoring force. This eliminates any clearances between the light guide plate 3 and both side faces of the groove 5 and keeps them fixed, so as to improve the lighting effect and keep it reliable.

A configuration of lateral light source is configured in this embodiment of the LED panel light, where LED light bars 2 are designed in both sides of the light guide plate 3. The light guide plate 3 scatters the light and turns the light source into a surface light source. Light will be throughout the panel light by multiple scattering with the light guide plate 3 and the inward light will be reflected out by total reflection with the reflective film 14. The diffuser plate 15 makes the light softer and more uniform. The combination of these factors ensures a high effective light.

Figure 3:
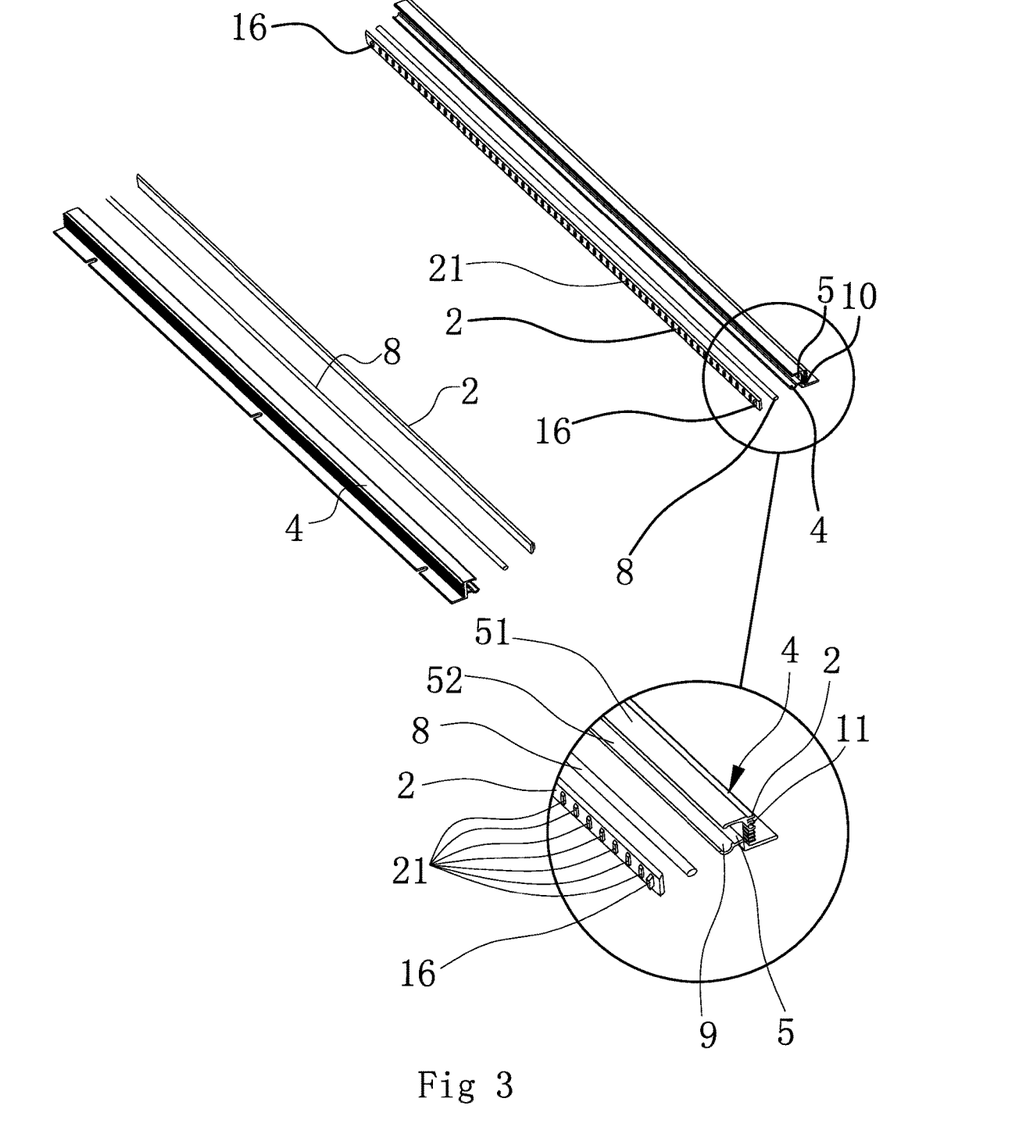
FIG. 3 is an exploded view and partial enlarged view of seats of an embodiment of the LED panel light with the cover and light guide plate.

In this embodiment, the LED panel light is installed on walls or ceilings. The direction toward the cover 1 is determined as "upper" and the lighting direction is "down" herein. As shown in FIG. 6 and FIG. 3, the elastic rubber strips 8 are of a cylinder shape, and the preferred material is silicon rubber. There are arc slots 9 designed on the side faces of the groove 5, into which the elastic rubber strips 8 are embedded. The lower side face of the groove 5 is formed of the first seat sidewall 51, and the upper side face of the groove 5 is formed of the second seat sidewall 52. The first seat sidewall and the second seat sidewall form a flare. The flange 7 is located in the outer edge of the first seat sidewall 51. The arc slot 9 is located in the outer edge of the second seat sidewall 52, and the flange 7 is aligned with the arc slot 9. The seats 4 are made of metal good at conducting the heat, on which there are several heat sink strips 10 in the lengthwise direction of the seats 4. These heat sink strips 10 are parallel to each other and equally spaced. The heat dissipation efficiency will be increased and the light attenuation will be reduced, by using the heat sink strips 10 to enlarge the contact area between the heat and air.

As shown in FIG. 3, there are protrusions 16 designed on the LED light bar 2. The protrusions 16 are in line with the LED light beads 21 and the height is greater than the height of LED light beads. The outer end of the protrusion 16 leans against the end face 31 of the light guide plate 3. There are two protrusions 16 in total and the LED light beads 21 are located between them.

Figure 2:
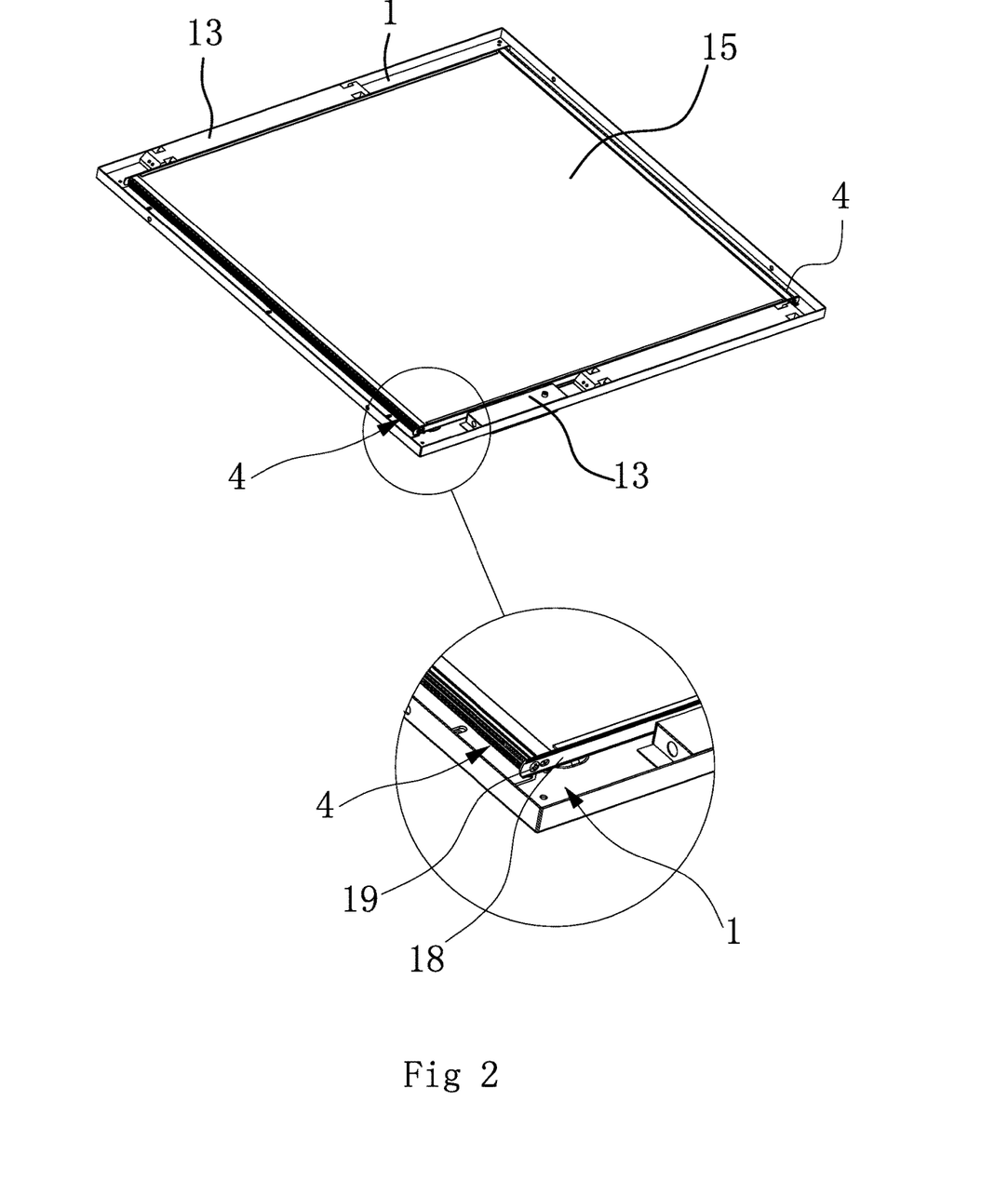
FIG. 2 is a schematic front view and partial enlarged view of the inner structure of an embodiment of the LED panel light with frame removed.

As shown in FIG. 6, FIG. 3, and FIG. 2, there is a recess 32 designed on the end face 31 of the light guide plate 3, in the lengthwise direction of the seat 4. The protrusions 16 are located in the recess 32. On the heat sink strips 10, there are screw holes 11 in the lengthwise direction of the seats 4. There are retainer slabs 18 configured between the ends of both seats 4 to help the seats 4 clamp the light guide plate 3 firm. The retainer slabs 18 are fixed by the bolts 19 and the screw holes 11.

Figure 4:
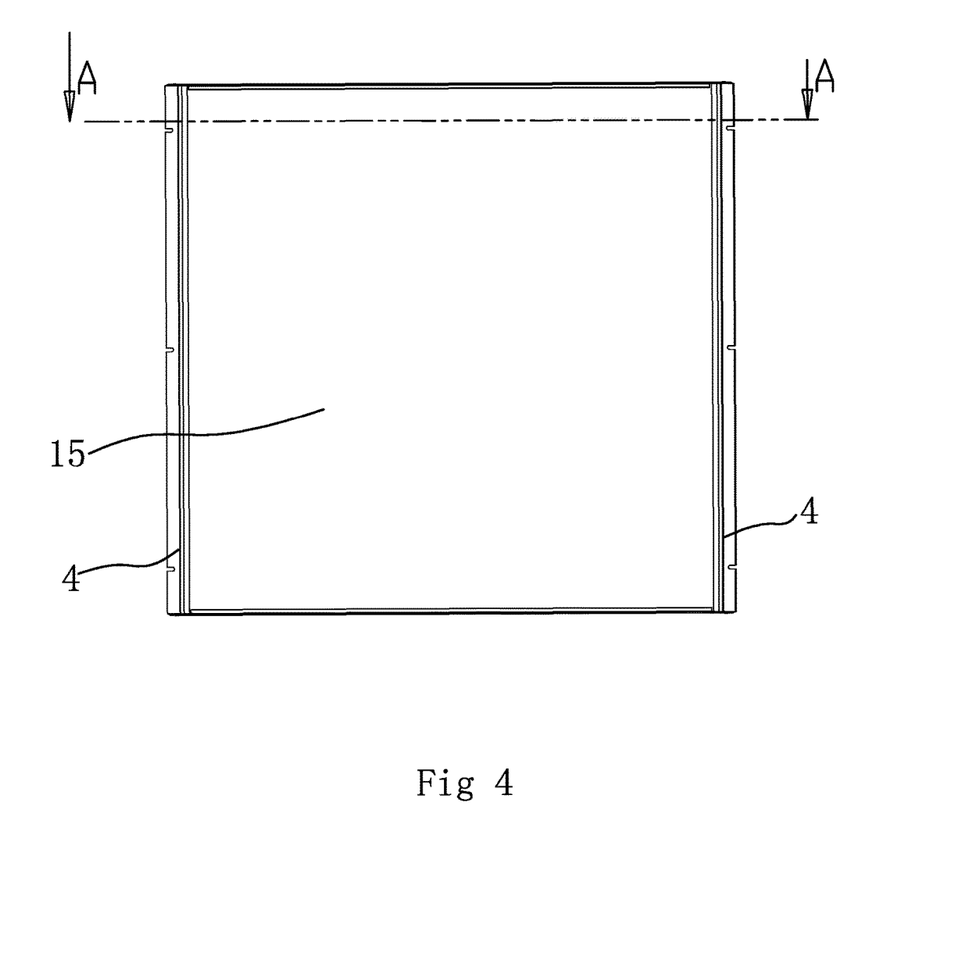
FIG. 4 is a front view of an embodiment of the LED panel light with the cover and frame removed.

As shown in FIG. 2 and FIG. 4, an embodiment of the LED panel light comprises a frame 12 which connects to the cover 1. There is a rectangular clearance between the frame 12 and the retainer slabs 18. Inside the clearance, there is a driver power converter 13. In this embodiment, the connection between the frame 12 and the cover 1 is detachable, so that it is convenient for the assembly, repair and replacement of the interior parts. The driver power converter 13 is installed in the clearance between the frame 12 and the cover 1, which can effectively protect the interior parts from being crushed or loosing during the process of transportation and use, so as to reduce the fault rate of the driver power converter 13 and make it more attractive. The service life of the driver power converter 13 typically affects the overall lifespan of the light fixture. The theoretical lifespan of LED light beads on the LED light bar 2 is 0.05 million hours to 0.1 million hours, and the lifespan of the driver power converter 13 is 0.002 million hours to 0.03 million hours, therefore, the overall lifespan of the LED panel light will be increased.

As shown in FIG. 3, in this embodiment, the height of the protrusion 16 is greater than the height of LED light beads 21 on the LED light bars 2 by 0.1 mm to 0.5 mm, and 0.25 mm is preferred. The LED light bar 2 is bonded to the bottom face of the groove 5 with thermally conductive adhesive. On the top face of the light guide plate 3, there are raised dots or small pits to scatter the light. The raised dots and the small pits are arranged sparsely in both sides and gradually more densely to the middle of the light guide plate 3. The diffuser plate 15 is made of PMMA, PS, or PC plastic sheets, the cover 1 is made of iron sheets, and the frame 12 is made of aluminum alloy.

The description of the preferred embodiments serves only as an illustration of the spirit of the invention. It will be understood by those skilled in the art that various changes or supplements in form and details may be made therein without departing from the spirit and scope of the invention as defined by the appended claims.

Although the terms of Cover 1, LED Light Bar 2, LED Light Bead 21, Light Guide Plate 3, end face 31, Recess 32, Seat 4, Groove 5, First Seat Sidewall 51, Second Seat Sidewall 52, Flange 7, Elastic Rubber Strip 8, Arc Slot 9, Heat Sink Strip 10, Screw Hole 11, Frame 12, Driver Power Converter 13, Reflective Film 14, Diffuser Plate 15, Protrusion 16, Reinforcing Rib 17, Retainer Slab 18, and Bolt 19 are used for multiple times herein, it does not exclude the use of any other terms. The terms are used to more conveniently describe or explain the nature of the embodiments. Any additional restrictions are contrary to the spirit of the present invention.

LIST OF REFERENCE NUMERALS

1 Cover
2 LED Light Bar
21 LED Light Bead
3 Light Guide Plate
31 End Face
32 Recess
4 Seat
5 Groove
51 First Seat Sidewall
52 Second Seat Sidewall
7 Flange
8 Elastic Rubber Strip
9 Arc Slot
10 Heat Sink Strip
11 Screw Hole
12 Frame
13 Driver Power Converter
14 Reflective Film
15 Diffuser Plate
16 Protrusion
17 Reinforcing Rib
18 Retainer Slab
19 Bolt

What is claimed is:

1. An LED panel light comprising:
a cover (1);
LED light bars (2);
two long and strip-shaped seats (4) that are fixed on an inside face of the cover (1) and are used to fasten the LED light bars (2);
a light guide plate (3) between the two seats (4); and
LED light beads (21) on the LED light bars (2) face the light guide plate (3);
wherein on each seat (4), there is a groove (5) designed in the lengthwise direction;
wherein each of the LED light bars (2) is fixed at a bottom face of one of the grooves respectively;
wherein on a lower side face of the respective groove (5), there is a flange (7) protruding toward an upper side face of the groove (5);
wherein on an upper side face of the respective groove (5), there are elastic rubber strips (8) installed in the lengthwise direction; and
wherein edges of the light guide plate (3) plunge into the grooves (5) and two side faces of the light guide plate (3) press against the flanges (7) and the elastic rubber strips (8), and in each respective seat, the lower side face of the groove (5) is formed of a first seat sidewall (51), the upper side face of the groove (5) is formed of a second seat sidewall (52), and the first seat sidewall (51) and the second seat sidewall (52) form a flare and the flange (7) is located in an outer edge of the first seat sidewall (51), an arc slot (9) is located in an outer edge of the second seat sidewall (52), and the flange (7) is aligned with the arc slot (9).

2. The LED panel light as claimed in claim 1, wherein in each respective seat, the arc slots (9) are designed on the side faces of the groove (5) into which the elastic rubber strips (8) are embedded, the elastic rubber strips (8) having a cylinder shape.

3. The LED panel light as claimed in claim 2 wherein the seats (4) are made of heat conducting metal, on which there are several heat sink strips (10) in the lengthwise direction of the seats (4), and the heat sink strips (10) are parallel to each other and are equally spaced.

4. The LED panel light as claimed in claim 3 wherein there is at least one protrusion (16) designed on each LED light bar (2), each protrusion (16) is in line with the corresponding LED light beads (21) on each LED light bar (2) and a height of each protrusion (16) is greater than a height of the corresponding LED light beads (21) on each LED light bar (2), and an outer end of each protrusion (16) leans against a respective end face (31) of the light guide plate (3).

5. The LED panel light as claimed in claim 4 wherein there are two protrusions (16) in total on each LED light bar (2) and the respective LED light beads (21) are located between the two corresponding protrusions (16).

6. The LED panel light as claimed in claim 5 wherein the height of the protrusions (16) is greater than the height of the LED light beads (21) on each of the LED light bars (2) by 0.1 mm to 0.5 mm.

7. The LED panel light as claimed in claim 5 wherein there is a recess (32) designed on each end face (31) of the light guide plate (3) in the lengthwise direction of each seat (4) and corresponding to each seat (4), and the protrusions (16) of each LED light bar (2) are located in a respective recess (32).

8. The LED panel light as claimed in claim 7 wherein on the heat sink strips (10), there are screw holes (11) in the lengthwise direction of the seats (4), there are retainer slabs (18) configured between ends of both seats (4) to help the seats (4) clamp the light guide plate (3) firm, and the retainer slabs (18) are fixed by bolts (19) and the screw holes (11).

9. The LED panel light as claimed in claim 8 further comprising:
a frame (12) that connects to the cover (1);

a rectangular clearance between the frame (12) and the retainer slabs (18); and a driver power converter (13) inside the clearance.

10. The LED panel light as claimed in claim 9 wherein a reflective film (14) is installed on a top face of the light guide plate (3), while a diffuser plate (15) is installed on a bottom face of the light guide plate (3).

11. The LED panel light valve as claimed in claim 10 wherein each LED light bar (2) is bonded to the bottom face of the respective groove (5) with thermally conductive adhesive.

12. The LED panel light as claimed in claim 11 wherein the diffuser plate (15) is made of PMMA, PS, or PC plastic sheets, the cover (1) is made of iron sheets, and the frame (12) is made of aluminum alloy.

13. The LED panel light as claimed in claim 12 wherein the cover (1) is rectangular, there are reinforcing ribs (17) along a diagonal of the cover (1), the reinforcing ribs (17) are formed by pressing an inner side of the cover (1) outward, and the reinforcing ribs (17) enclose a cavity to place cables.

\* \* \* \* \*